United States Patent [19]

Manor et al.

[11] Patent Number: 4,896,563
[45] Date of Patent: Jan. 30, 1990

[54] HYDRAULIC MECHANICAL POWER DRIVE FOR HEAVY VEHICLES

[75] Inventors: Gedalyahu Manor; Dan Wolf, both of Haifa, Israel

[73] Assignee: Technion Research & Development Foundation Limited, Haifa, Israel

[21] Appl. No.: 277,635

[22] Filed: Nov. 28, 1988

[51] Int. Cl.⁴ .................. F16H 47/04; F16H 48/08
[52] U.S. Cl. ........................................ 74/677; 74/687
[58] Field of Search ................................ 74/677, 687

[56] References Cited

U.S. PATENT DOCUMENTS 3,748,924  7/1973  Cross et al. ...................... 74/677
4,471,669  9/1984  Seaberg ............................ 74/687

Primary Examiner—Dirk Wright
Attorney, Agent, or Firm—Browdy & Neimark

[57] ABSTRACT

A hydraulic-mechanical transmission for a heavy vehicle as shown in FIG. 5 includes a hydraulic variable-displacement pump (I) supplying fluid under pressure to two hydraulic, variable-displacement motors (II, III), controlled by valves (64, 65). It further includes a planetary gear (IV) enclosed in a casing (1) which can be driven by one of the motors (II) through a pinion (51) and an external ring gear (10). The second motor (III) can drive the casing (1) which latter is mounted direct on the motor shaft (40). A planet carrier (2) can be coupled to the casing (1) by a clutch (33) or is freely movable in the casing. A sun gear (31) is mounted on an output shaft (3), while the planet gears (20) engage with an internal gear (11) of the casing. Three speeds and torques are available by respectively driving the planetary gear by either motor or by both motors together and by alternately coupling the planet carrier to the casing or having it freely rotating by operation of the clutch.

3 Claims, 5 Drawing Sheets

HYDRAULIC MECHANICAL POWER DRIVE FOR HEAVY VEHICLES

BACKGROUND OF THE INVENTION

The invention relates to the power drive of heavy vehicles, particularly to the hydraulic-mechanical transmission of power from the vehicle engine to the shafts to the traction wheels. It relates more especially to the use of a hydraulic pump coupled to the vehicle engine adapted to supply liquid under pressure to two hydraulic motors adapted to transmit torque to the traction wheels or to the tracks on both sides of the vehicle via a planetary gear unit.

The known hydraulic power transmissions in heavy vehicles comprise a hydraulic pump driven by the engine and supplying liquid under pressure to a hydraulic motor which is coupled to the traction wheels, in many instances through a variable gear transmission. The system is especially useful in the case of tracked vehicles provided with hydraulic motors on both sides, whereby steering of the tracked vehicle is performed by having the two motors rotating at different speeds, whenever a bend in the road is to be navigated. Both hydraulic pump and motors are of the variable displacement type, permitting varying of the output torque and the revolutions in accordance with the road resistance and the vehicle speed.

This system replaces to a large extent the well-known automatic gear transmissions which are used in cars and light trucks, which would, however, be of excessive size in the case of heavy vehicles, especially tracked vehicles driven by engines having an output of several hundreds of horsepowers.

The size of the pump and the motor is determined by the maximum torque delivered by the engine and the maximum revolutions required to drive the vehicle. An IC-engine characteristic is in the shape of a curve "a" as illustrated in FIG. 1, which shows a high torque at low speed and a low torque at high speed. A hydraulic, variable-displacment motor adapted to transmit the torque at the respective revolutions has very large dimensions, since its maximum output required (at point "b" of FIG. 1) equals the maximum torque times maximum velocity, which is much higher than the maximum engine output at any speed, and the hydraulic motor cannot be used efficiently and its power is wasted.

Of course, by placing a mechanical gear transmission between the hydraulic motor and the output shaft, it is possible to increase the vehicle speed without having to increase the motor displacement, but this system distracts from the advantages of the stepless speed possible with the hydraulic system and be not advance compared with the conventional automatic gear transmission. FIG. 2 shows a diagram of the output of a hydraulic motor in conjunction with a three-step transmission.

It is the object of the present invention to replace one large hydraulic motor by two hydraulic motors of smaller output each.

It is another object to provide three different gear ratios at different outputs and revolutions of the two hydraulic motors.

And it is a final object to provide a hydraulic-mechanical power transmission of simple design at relatively low cost, and to provide simple, automatic control means adapted to utilize the engine power at its most efficient output and speed.

SHORT DESCRIPTION OF THE DRAWINGS

Two different embodiments of the hydraulic-mechanical power transmission have been devised and are illustrated in the following drawings, wherein FIG. 1 shows a torque-velocity diagram of an IC-engine and of a hydraulic motor suitable for transmitting the engine output to a driven traction axle, FIG. 2 is a torque-velocity diagram of an IC-engine and the output through a three-speed gear transmission, FIG. 3 is a cross section through a planetary gear unit driven by two hydraulic motors, the Figure also showing the motors, the hydraulic pump and control means, FIG. 4 is a section along line A—A of the planetary gear unit illustrated in FIG. 3

FIG. 5 illustrates another embodiment of the power transmission showing the planetary gear unit in cross section, the two motors, the hydraulic pump and control means, FIG. 6 shows the power available at the output shaft of the planetary gear unit from standstill to maximum revolutions, and FIG. 7 is a diagrammatical view of a simplified hydraulic-mechanical transmission based on the principle of two hydraulic motors actuating a gear wheel.

DETAILED DESCRIPTION OF THE DRAWINGS

Figure 1:
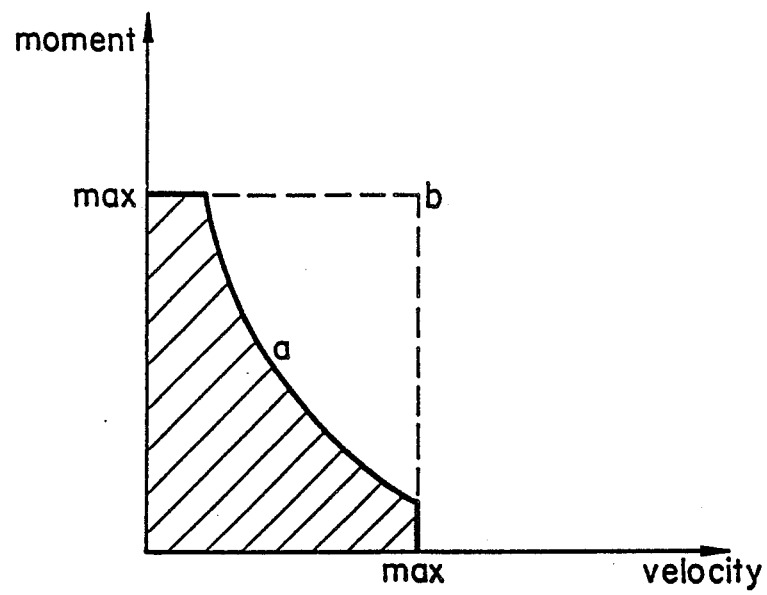
Figure 2:
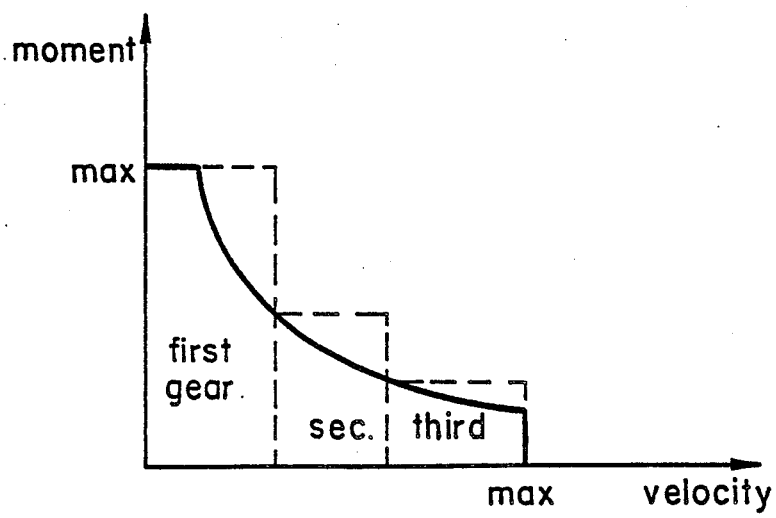
Figure 3:
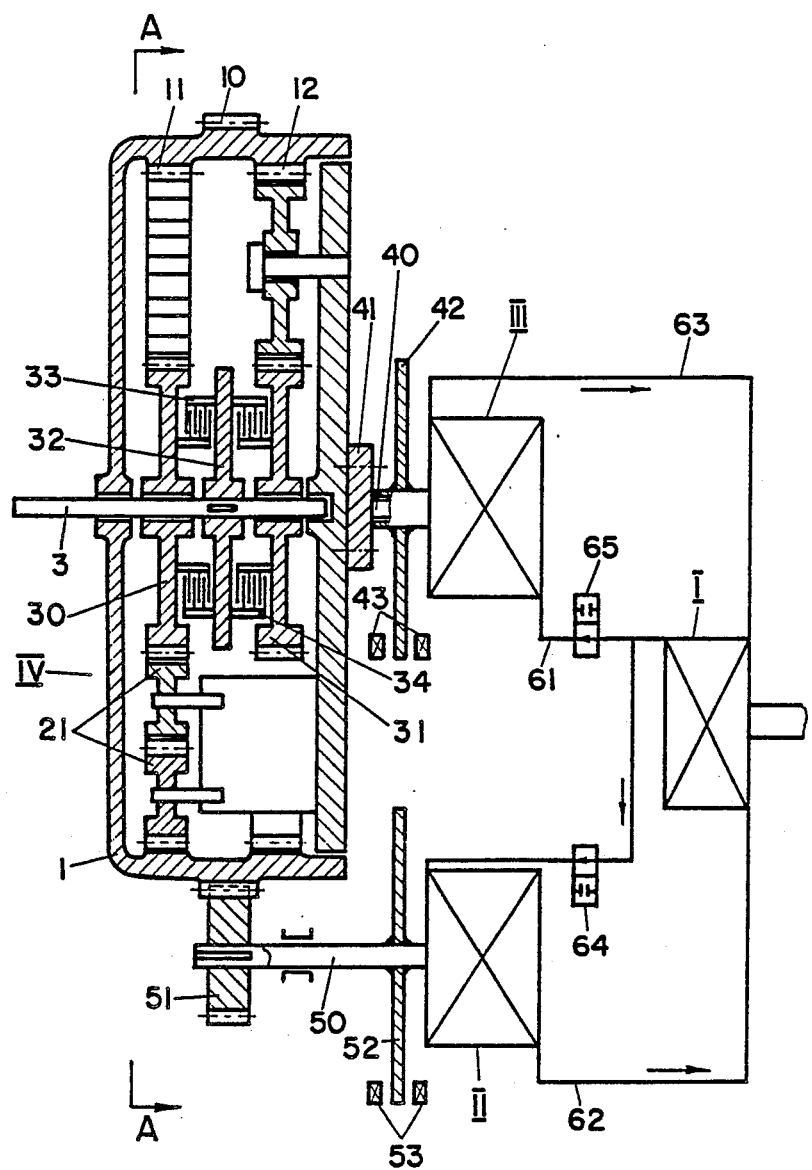
Figure 4:
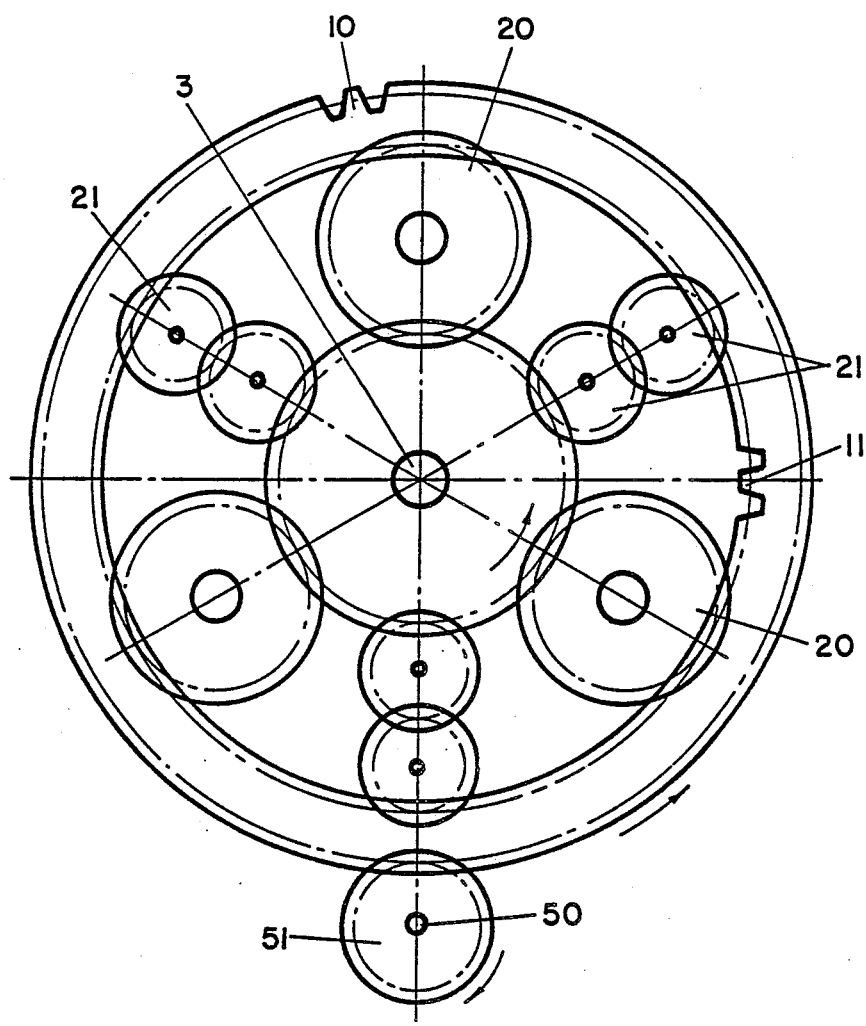

The power transmission illustrated in FIGS. 3 and 4 comprises a variable-displacement hydraulic motor II, a second hydraulic, variable-displacement motor III and a planetary gear unit IV; The planetary gear unit comprises an outer cylindrical casing 1 provided with an external ring gear 10 and two parallel internal ring gears 11 and 12. The unit further comprises a planet carrier 2 coaxially aligned with casing 1 and carrying one set of three straight planetary gear wheels 20 and one set of six reverse planetary gear wheels 21. The unit further comprises an output shaft 3 carried in bearings in both the casing and the planet carrier, on which are mounted two parallel sun gears 30 and 31 in freely rotatable relationship, and a clutch plate 32, the latter being firmly connected to the shaft. Two clutches 33 and 34 are interposed between the clutch plate and the two sun gears and are adapted to firmly engage the clutch plate to either sun gear or to both simultaneously.

The output shaft 40 of the second hydraulic motor III is firmly connected to the planet carrier 2 by means of a flange 41, and carries in addition a brake disc 42 adapted to block the motor by means of brake shoes 43.

The ring gear casing 1 is rotated by means of the motor II through a pinion 51 firmly mounted on the output shaft 50 of the motor, which carries in addition a brake disc 52 adapted to block the motor by brake shoes 53.

Each hydraulic motor may be driven separately by fluid delivered by the pump I, or both motors may be driven simultaneously, but at different speeds, as explained in the following: at the start a high torque or moment at low rotational speed of the output shaft 3 is required to accelerate the vehicle. For this purpose the clutches 33 and 34 are energized to engage the clutch plate with both sun gears 30 and 31, whereby the planetary gear unit rotates as one rigid unit. The pump delivers fluid to both motors which give a maximum torque at low rotary speeds, whereby the motor II rotates at a higher speed than motor III, depending on the gear ratio of pinion 51 to ring gear 10. After the vehicle has gained speed the clutch 34 is released, while clutch 33 engages sun gear 30 and motor III is stopped and blocked. Motor II now rotates the casing 1 thereby rotating sun gear 30 through the reverse planetary gear wheels 21 as well as the output shaft 3 coupled to sun gear 30 by clutch 33 and clutch plate 32. The arrangement results in the second, higher speed of the output shaft in accordance with the gear ratio of ring gear to sun gear.

A third gear ratio is obtained by releasing clutch 33 and engaging clutch plate 32 with sun gear 31 by means of clutch 34 and by stopping and braking motor II. This effects rotation of the planet carrier 2, and rotation of output shaft 3 via the straight planetary gears 20, sun gear 31, clutch 34 and clutchplate 32, resulting in still higher revolutions of output shaft 3.

Choosing, as an example, the sizes of the different gears as follows:

pinion 51 to ring gear 10: 1:2;
ring gears 11 and 12 to sun gears 30 and 31: 2:1;

then in first gear output shaft speed equals speed of motor II, while motor II will run at twice the speed of motor III;

In second gear the output speed equals the speed of motor II i.e. double the speed in the first gear, since motor II runs at twice the speed of motor III. In third gear the output shaft will run at three times the speed of that of the motor III, which is the result of the planetary gear ratio.

It will be understood that both hydraulic motors are of identical size and displacement and rotatable at the same maximum speed, which will produce a large range of outputs and speeds at the shaft end 3.

The motors are hydraulically connected to pump I by pressure lines 60, 61 and return lines 62, 63, automatic regulation of fluid delivery being carried out by controlling the pump volume, while the valves 64, 65, permit reversing, in a known manner, and serve to brake each motor, with or without applying the brake shoes 43, 53.

Figure 5:
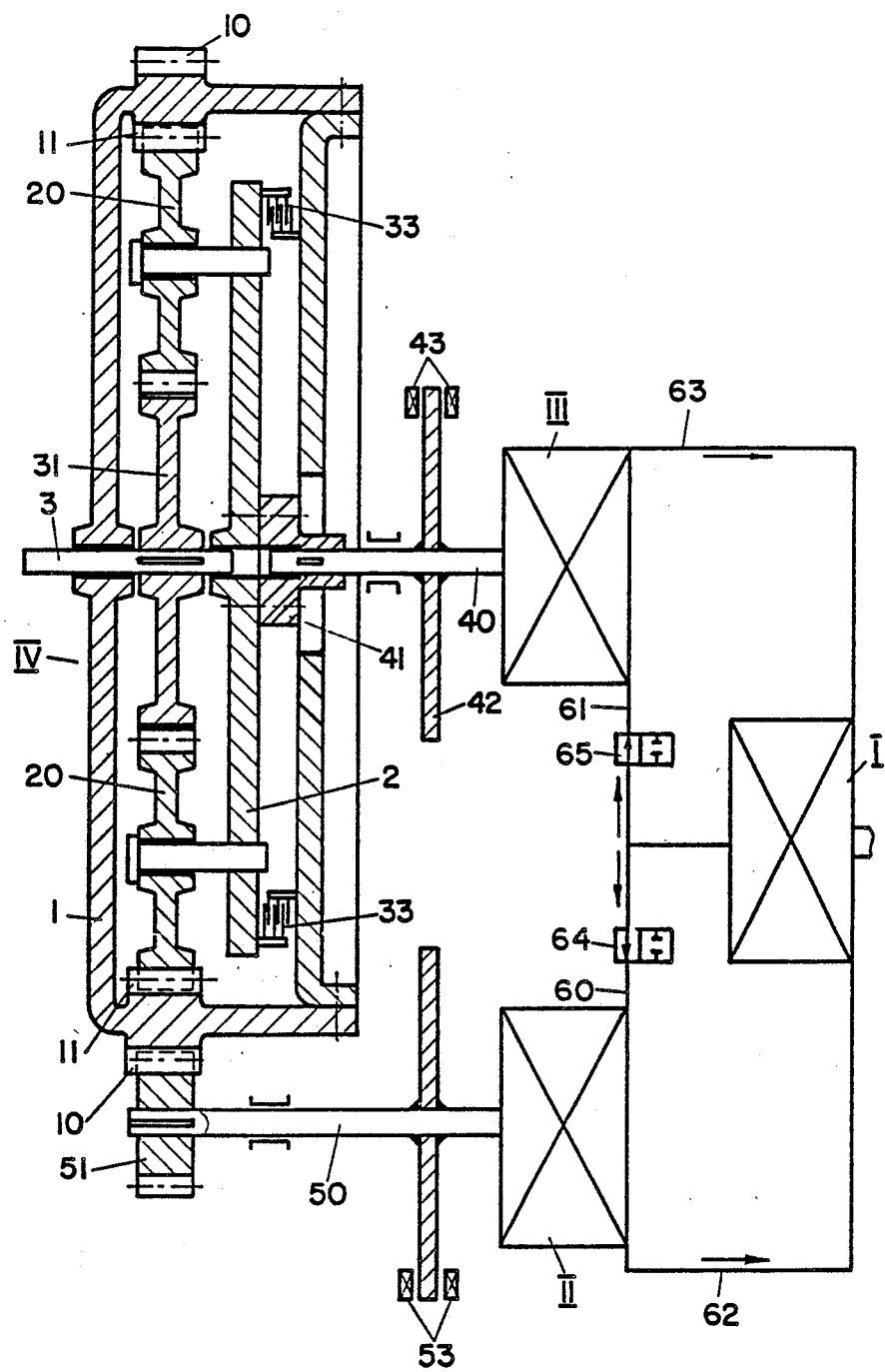

A simpler planetary gear unit is depicted in FIG. 5 which, however, requires reversal of the revolutions of hydraulic motor II in second gear. The arrangement of pump I, of the hydraulic motors II and III and their hydraulic connections are identical with the arrangement of the aforedescribed embodiment; however, in the planetary gear unit the reverse planetary gear wheels as well as the appropriate sun gear have been omitted. This, obviously makes the second clutch superfluous. In FIG. 5 all components which are identical or similar to those shown in FIGS. 3 and 4 have been denoted by identical numerals, which will facilitate comparison of the two embodiments.

The operation is similar to that of the first embodiment: in low gear clutch 33 engages casing 1 with planet carrier 2, whereby the planets are blocked and the gear rotates as a rigid unit. Both motors are energized, whereby motor II rotates at higher speed than motor III.

In second gear clutch 33 is released, the revolutions of motor II are reversed and motor III is stopped. This will reverse the sense of rotation of casing 1, while the planet carrier is at standstill; planets 20 will now rotate in place and drive sun gear 31 together with shaft 3 in the same direction as before, but at higher speed.

In third gear clutch 33 is released, motor II is stopped and motor III energized which will drive the output shaft at still higher revolutions.

In the transmission illustrated in FIG. 7 the planetary gears of the two aforedescribed embodiments have been omitted and replaced by a large gear wheel 10'. This gear wheel is adapted to be driven by the hydraulic motors II and III by means of the pinions 51 and 41' respectively which are fastened to the motor shaft 50 via the clutch 54 and direct to motor shaft 40. There are two speeds available: a low speed wherein the gear 10' and the output shaft 3 are driven simultaneously by both motors at high torque, and a high speed, motor III driving the gear 10' through pinion 41' at low torque. The motor not in action is shut off by one of the valves 64 and is disconnected by clutch 54.

It will be understood that instead of two motors, three or more motors may be installed, each motor provided with another size pinion. This arrangement will permit to gradually increase the speed of shaft 3 by driving the gearwheel by motors of gradually increasing pinion size without experiencing noticeable shocks between gear changes.

Figure 6:
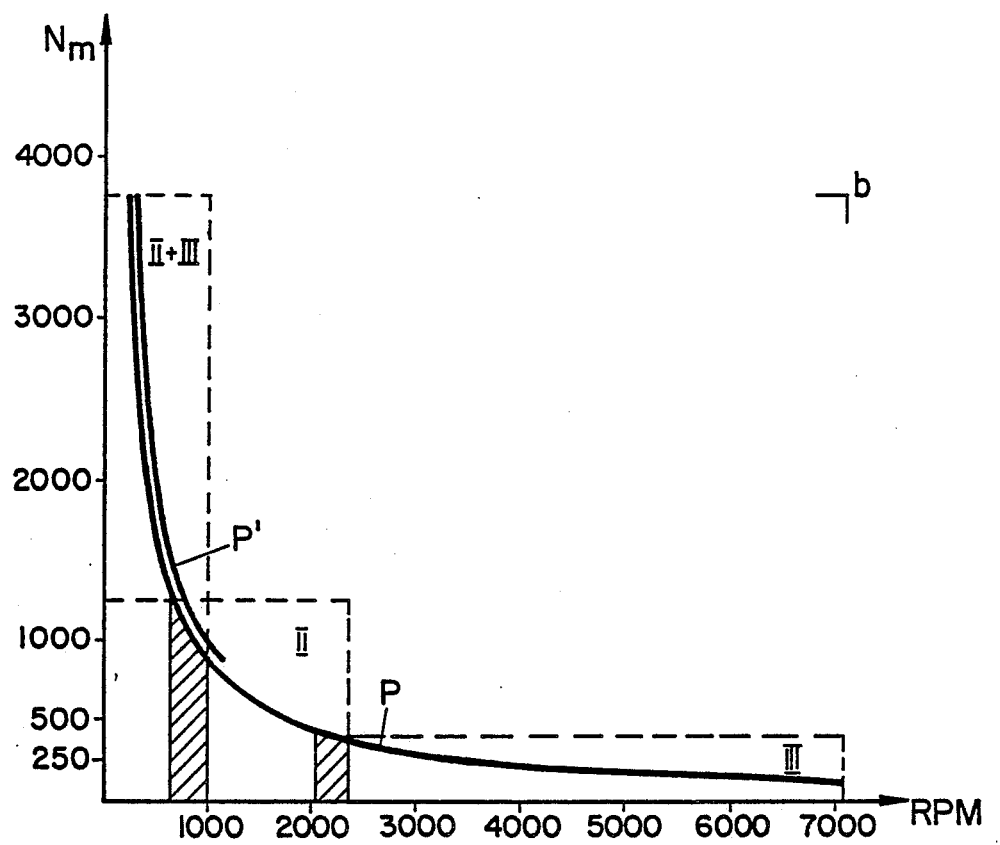

FIG. 6 illustrates the power curve P at the output shaft at various revolutions for a hydraulic-mechanical transmission of given dimensions: Up to 1000 rpm both hydraulic motors II and III operate the rigid planetary gear unit; up to 2400 rpm motor II drives the ring gear, while the planet carrier is stopped; and up to 7000 rpm motor III drives the planet carrier, while the ring gear is at standstill. The curve P' indicates the power available by utilizing the short spurt of extra power which an IC-engine can develop by shutting off its auxiliary appliances, such as the cooling fan.

We claim:

1. A hydraulic-mechanical power transmission for heavy vehicles comprising:

a hydraulic, variable-displacement pump (I) driven by an internal combustion engine, a first (II) and a second (III) hydraulic, variable-displacement motor both supplied fluid under pressure by said hydraulic pump (I) and controlled by valve means (64), (65), a planetary gear unit consisting of a cylindrical casing (1) containing an internal ring gear (11) and an external ring gear (10), a sun gear (31) mounted on an output shaft (3), planetary gear wheels (20) mounted on a planet-carrier (2) in mesh with said internal ring gear and with said sun gear, and a clutch (33) serving, in engaged state, to prevent relative motion of said casing and said planet carrier to effect said unit to rotate as a rigid unit, the power transmission being characterized by said first motor (II) serving to rotate said casing (1), by means of a pinion (51) in mesh with said external ring gear (10), by said second (III) motor serving to rotate said planet-carrier, whereby three different speeds are available: a low speed, by said planetary gear unit being rotated as a rigid unit by said two motors simultaneously; a medium speed by said first motor rotating said casing with said clutch released and said second motor being at standstill; and a high speed, by said second motor rotating said planet carrier and said first motor being at standstill.

2. The hydraulic-mechanical power transmission of claim 1, wherein said planetary gear unit comprises a cylindrical casing (1) provided with a first (12) and a second (11) internal ring gear and an external ring gear (10), said external ring gear being in mesh with a pinion (51) mounted on the output shaft (50) of said first motor, a planet carrier (2) directly connected to the output shaft (40) of said second motor (III) and adapted to be rotated at the motor speed, an output shaft (3) freely movable in bearings in said ring gear casing (1) and in said planet carrier (2) and comprising a clutch plate (32) firmly connected to said shaft as well as a first (30) and a second (31) sun gear rotatably mounted on said shaft on opposite sides of said clutch plate, a first (33) and a second (34) clutch means adapted to engage said clutch plate with either said first or said second sun gear, or alternatively with both sun gears, a first set of planetary gear wheels (20) in constant mesh with said first internal ring gear (12), and a second set of reverse planetary gear wheels (21) in constant mesh with said second internal ring (11) gear and said second sun gear.

3. The hydraulic-mechanical power transmission of claim 1, including a disc brake mounted on the shaft of at least one of said hydraulic motors.

* * * * *